(12) United States Patent
Medwed et al.

(10) Patent No.: US 11,770,700 B2
(45) Date of Patent: Sep. 26, 2023

(54) CLIENT PRIVACY PRESERVING SESSION RESUMPTION

(71) Applicant: NXP B.V., Eindhoven (NL)

(72) Inventors: Marcel Medwed, Graz (AT); Stefan Lemsitzer, Stainz (AT)

(73) Assignee: NXP B.V., Eindhoven (NL)

( * ) Notice: Subject to any disclaimer, the term of this patent is extended or adjusted under 35 U.S.C. 154(b) by 0 days.

(21) Appl. No.: 17/851,609

(22) Filed: Jun. 28, 2022

(65) Prior Publication Data
US 2022/0330016 A1   Oct. 13, 2022

Related U.S. Application Data

(62) Division of application No. 16/839,719, filed on Apr. 3, 2020, now Pat. No. 11,412,373.

(51) Int. Cl.
| | |
|---|---|
| *H04W 12/02* | (2009.01) |
| *H04W 12/0433* | (2021.01) |
| *H04W 12/069* | (2021.01) |
| *H04L 9/32* | (2006.01) |
| *H04L 9/40* | (2022.01) |

(52) U.S. Cl.
CPC ........... *H04W 12/02* (2013.01); *H04L 9/3236* (2013.01); *H04L 63/0869* (2013.01); *H04W 12/0433* (2021.01); *H04W 12/069* (2021.01)

(58) Field of Classification Search
CPC ............... H04L 63/0869; H04L 9/3236; H04L 63/0421; H04L 63/0428; H04L 67/14; H04W 12/02; H04W 12/0433; H04W 12/069
See application file for complete search history.

(56) References Cited

U.S. PATENT DOCUMENTS

| | | | | |
|---|---|---|---|---|
| 7,509,495 | B2 * | 3/2009 | Roig ..................... | H04L 63/083 |
| | | | | 713/168 |
| 7,865,730 | B2 * | 1/2011 | Cortez .................... | H04L 9/065 |
| | | | | 380/255 |
| 8,156,332 | B2 * | 4/2012 | Simon ................... | H04L 9/3226 |
| | | | | 713/168 |
| 8,880,885 | B2 * | 11/2014 | Lekies .................. | H04L 9/3242 |
| | | | | 713/169 |
| 8,966,276 | B2 * | 2/2015 | Nanopoulos ........ | H04L 63/0853 |
| | | | | 726/8 |
| 9,021,269 | B2 * | 4/2015 | Spilman ................ | H04L 9/3239 |
| | | | | 713/168 |
| 9,294,281 | B2 * | 3/2016 | Schechter ............. | H04L 9/3239 |

(Continued)

OTHER PUBLICATIONS

Search Query Report from IP.com (performed Mar. 3, 2023) (Year: 2023).*

*Primary Examiner* — Sharon S Lynch

(57) ABSTRACT

Various embodiments relate to a method and system for resuming a secure communication session with a server by a device, including: sending a message to the server requesting the resumption of a secure communication session; receiving from the server a server identifier, a server nonce, and a salt; determining that the device has a shared key with the server based upon the server identifier; determining that the received salt is valid; calculating a salted identifier based upon the shared key and the salt; sending the salted identifier to the server; and resuming the secure communication session with the server.

12 Claims, 2 Drawing Sheets

(56) References Cited

U.S. PATENT DOCUMENTS

| | | | |
|---|---|---|---|
| 9,536,067 B1* | 1/2017 | Lee | G06F 21/31 |
| 9,544,280 B2* | 1/2017 | Schechter | H04L 9/3226 |
| 9,590,950 B2* | 3/2017 | Hallett | H04L 63/0421 |
| 9,900,291 B2* | 2/2018 | Li | H04L 65/60 |
| 10,057,065 B2* | 8/2018 | Reinhold | H04L 63/06 |
| 10,380,098 B1* | 8/2019 | Marelas | G06F 16/2365 |
| 10,546,444 B2* | 1/2020 | Osborn | G06Q 20/385 |
| 10,873,458 B2* | 12/2020 | Reinhold | G06F 21/45 |
| 11,200,224 B2* | 12/2021 | Marelas | G06F 16/2255 |
| 2002/0071563 A1* | 6/2002 | Kurn | H04L 9/16 380/280 |
| 2005/0022020 A1* | 1/2005 | Fremberg | H04L 63/1466 726/4 |
| 2005/0166263 A1* | 7/2005 | Nanopoulos | H04L 63/0838 726/19 |
| 2007/0061571 A1* | 3/2007 | Hammes | G06F 21/31 713/168 |
| 2007/0180230 A1* | 8/2007 | Cortez | H04L 9/302 713/156 |
| 2008/0301435 A1* | 12/2008 | Simon | H04L 9/3226 713/155 |
| 2013/0212385 A1* | 8/2013 | Schechter | H04L 9/0877 713/168 |
| 2014/0032922 A1* | 1/2014 | Spilman | G06F 21/602 713/184 |
| 2014/0101447 A1* | 4/2014 | Lekies | H04L 9/0841 713/169 |
| 2015/0089621 A1* | 3/2015 | Khalid | H04L 63/08 726/9 |
| 2015/0172272 A1* | 6/2015 | Levner | H04L 63/083 726/7 |
| 2015/0278545 A1* | 10/2015 | Bigras | G06F 21/44 726/26 |
| 2015/0304283 A1* | 10/2015 | Hallett | H04L 63/0421 726/29 |
| 2015/0304307 A1* | 10/2015 | Kaur | H04W 12/06 726/8 |
| 2016/0044034 A1* | 2/2016 | Spilman | H04L 63/083 713/181 |
| 2016/0173461 A1* | 6/2016 | Schechter | H04L 9/0894 713/168 |
| 2017/0272408 A1* | 9/2017 | Li | H04L 63/08 |
| 2019/0260730 A1* | 8/2019 | Mainali | G06F 21/316 |
| 2019/0327310 A1* | 10/2019 | Parthasarathy | H04L 67/145 |
| 2019/0332597 A1* | 10/2019 | Marelas | G06F 16/2365 |
| 2019/0392666 A1* | 12/2019 | Osborn | G06Q 20/4014 |
| 2022/0050821 A1* | 2/2022 | Marelas | G06F 11/1453 |
| 2022/0050822 A1* | 2/2022 | Marelas | G06F 11/1453 |
| 2022/0050823 A1* | 2/2022 | Marelas | G06F 16/2255 |

* cited by examiner

CLIENT PRIVACY PRESERVING SESSION RESUMPTION

CROSS-REFERENCE TO RELATED APPLICATIONS

This application claims priority under 35 U.S.C. § 119 to U.S. patent application Ser. No. 16/839,719, filed on Apr. 3, 2020, the contents of which are incorporated by reference herein.

TECHNICAL FIELD

Various exemplary embodiments disclosed herein relate generally to preserving client privacy during the resumption of a communication session.

BACKGROUND

Key establishment and authentication today usually takes place by using asymmetric cryptography, especially, when managing keys becomes a burden otherwise. However, at the same time can asymmetric protocols represent unnecessarily long authentication phases for ad-hoc connections including wireless connections. Various communication protocols include resumption mechanisms where a secure communication session is resumed using established symmetric cryptographic keys without the need for repeating an asymmetric protocol.

SUMMARY

A summary of various exemplary embodiments is presented below. Some simplifications and omissions may be made in the following summary, which is intended to highlight and introduce some aspects of the various exemplary embodiments, but not to limit the scope of the invention. Detailed descriptions of an exemplary embodiment adequate to allow those of ordinary skill in the art to make and use the inventive concepts will follow in later sections.

Various embodiments relate to a method for resuming, by a device, a secure communication session with a server, including: sending a message to the server requesting the resumption of a secure communication session; receiving from the server a server identifier, a server nonce, and a salt; determining that the device has a shared key with the server based upon the server identifier; determining that the received salt is valid; calculating a salted identifier based upon the shared key and the salt; sending the salted identifier to the server; and resuming the secure communication session with the server.

Various embodiments are described, wherein determining that the received salt is valid further includes: determining that the salt is greater than or equal to a salt threshold T; and updating the value of T to an incremented value of the salt.

Various embodiments are described, wherein determining that the received salt is valid further includes: determining that the salt is greater than or equal to a salt threshold T that a counter is less than a counter threshold value; incrementing the counter; when the salt is greater than the salt threshold T setting the salt threshold T equal to the salt and setting the counter to 0; and when the counter equals the counter threshold incrementing the salt threshold T and setting the counter to 0.

Various embodiments are described, wherein determining that the received salt is valid further includes: determining that the salt is greater than or equal to a salt threshold T; when the salt is greater than the salt threshold T, setting the salt threshold T equal to the salt and setting the current time to 0; and when the current time is greater than or equal to the time threshold performing an asymmetric mutual authentication.

Various embodiments are described, further including establishing a new session key.

Various embodiments are described, wherein the salted identifier is a hash of the salt and the shared key.

Further various embodiments relate to a method for resuming, by a server, a secure communication session with a device, including: storing salted identifiers in a server database, wherein the salted identifier is based upon shared keys and a salt; receiving a message from the device requesting the resumption of a secure communication session; sending to the device a server identifier, a server nonce, and the salt, and wherein the salt is a valid salt; receiving a salted identifier from the device; determining that the received salted identifier has a match in a server database; and resuming the secure communication session with the device.

Various embodiments are described, wherein the salt is updated based upon a policy where the salt increases.

Various embodiments are described, wherein the salt is incremented every N transactions, where N is an integer greater than or equal to 1.

Various embodiments are described, wherein the salt is incremented after a specified period of time has passed.

Various embodiments are described, further including establishing a new session key.

Various embodiments are described, wherein the salted identifier is a hash of the salt and the shared key.

Further various embodiments relate to a device configured to resume a secure communication session with a server, including: a memory; and a processor coupled to the memory, wherein the processor is further configured to: send a message to the server requesting the resumption of a secure communication session; receive from the server a server identifier, a server nonce, and a salt; determine that the device has a shared key with the server based upon the server identifier; determine that the received salt is valid; calculate a salted identifier based upon the shared key and the salt; send the salted identifier to the server; and resume the secure communication session with the server.

Various embodiments are described, wherein determining that the received salt is valid further includes: determining that the salt is greater than or equal to a salt threshold T; and updating the value of T to an incremented value of the salt.

Various embodiments are described, wherein determining that the received salt is valid further includes: determining that the salt is greater than or equal to a salt threshold T that a counter is less than a counter threshold value; incrementing the counter; when the salt is greater than the salt threshold T setting the salt threshold T equal to the salt and setting the counter to 0; and when the counter equals the counter threshold incrementing the salt threshold T and setting the counter to 0.

Various embodiments are described, wherein determining that the received salt is valid further includes: determining that the salt is greater than or equal to a salt threshold T; when the salt is greater than the salt threshold T, setting the salt threshold T equal to the salt and setting the current time to 0; and when the current time is greater or equal to than the time threshold performing an asymmetric mutual authentication.

Various embodiments are described, wherein the processor is further configured to establish a new session key.

Various embodiments are described, wherein the salted identifier is a hash of the salt and the shared key.

Further various embodiments relate to a server configured to resume a secure communication session with a device, including: a memory; a processor coupled to the memory, wherein the processor is further configured to: store salted identifiers in a server database, wherein the salted identifier is based upon shared keys and upon a salt; receive a message from the device requesting the resumption of a secure communication session; send to the device a server identifier, a server nonce, and the salt receive a salted identifier from the device; determine that the received salted identifier has a match in a server database; and resume the secure communication session with the device.

Various embodiments are described, wherein the salt is updated based upon a policy where the salt increases.

Various embodiments are described, wherein the salt is incremented every N transactions, where N is an integer greater than or equal to 1.

Various embodiments are described, wherein the salt is incremented after a specified period of time has passed.

Various embodiments are described, wherein the processor is further configured to establish a new session key.

Various embodiments are described, wherein the salted identifier is a hash of the salt and the shared key.

BRIEF DESCRIPTION OF THE DRAWINGS

In order to better understand various exemplary embodiments, reference is made to the accompanying drawings, wherein.

To facilitate understanding, identical reference numerals have been used to designate elements having substantially the same or similar structure and/or substantially the same or similar function.

DETAILED DESCRIPTION

Figure 1:
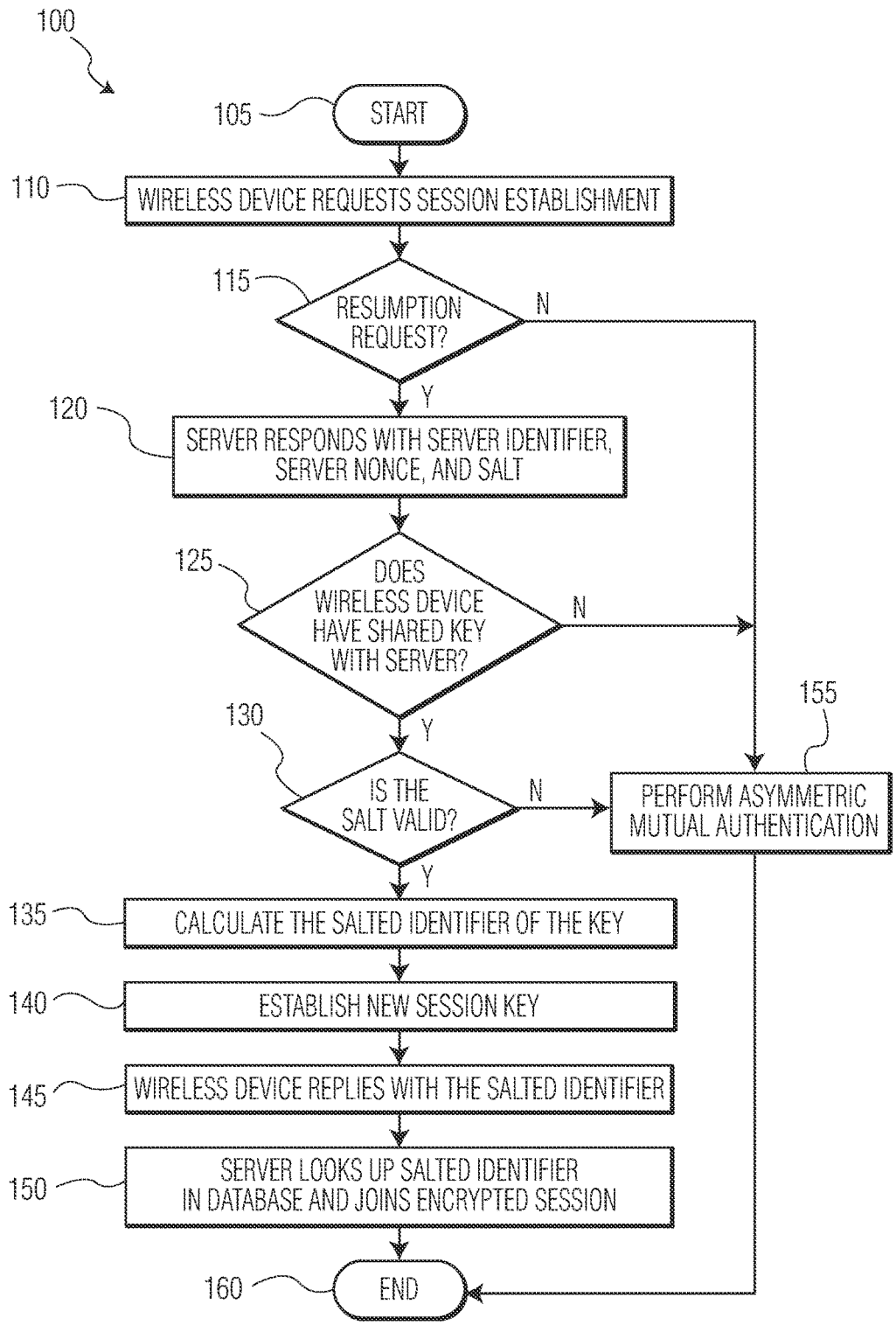
FIG. 1 illustrates a flow diagram for the resumption of a secure communication session between a wireless device and a server.

The description and drawings illustrate the principles of the invention. It will thus be appreciated that those skilled in the art will be able to devise various arrangements that, although not explicitly described or shown herein, embody the principles of the invention and are included within its scope. Furthermore, all examples recited herein are principally intended expressly to be for pedagogical purposes to aid the reader in understanding the principles of the invention and the concepts contributed by the inventor(s) to furthering the art and are to be construed as being without limitation to such specifically recited examples and conditions. Additionally, the term, "or," as used herein, refers to a non-exclusive or (i.e., and/or), unless otherwise indicated (e.g., "or else" or "or in the alternative"). Also, the various embodiments described herein are not necessarily mutually exclusive, as some embodiments can be combined with one or more other embodiments to form new embodiments.

Embodiments of a client privacy preserving session resumption mechanism will be described herein. Key establishment and authentication today usually take place by using asymmetric cryptography where an asymmetric cryptography is used to securely exchange a session key that typically uses a symmetric cryptographic protocol. Asymmetric cryptography is used when managing keys becomes a burden, for example, when establishing a secure communication session between a user of a wireless device and a server using the internet or a wireless communication channel. However, asymmetric protocols represent unnecessarily long authentication phases for ad-hoc connections, such as secure wireless connections. A resumption mechanism uses a symmetric protocol to securely resume a secure connection. In a wireless situation an internet protocol (IP) address is not available to use to resume the connection with a server, but the wireless device needs to probe the area to identify servers that are available to connect with. Once a server is found, the server needs to identify itself. The wireless device then determines if it knows the server, and the wireless device may transmit an identifier of a previous session with the server to the server and seek to resume a prior connection with the server. Without the session identifier, the server cannot resume the connection to the wireless device. The session identifier needs to be sent in the clear as plaintext, resulting in the wireless device being trackable, because this identifier may have to be sent multiple times before the session is resumed. In addition, current communication session resumption mechanisms like in transport layer security TLS version 1.3 (which is widely used for web browsing, email, instant message, voice over IP, etc.) cannot guarantee wireless device privacy in such an ad-hoc wireless setting. An embodiment of a session resumption mechanism that can overcome this problem will be described herein.

It is assumed that a session is already established between a wireless device and a server in a privacy preserving way, and both the wireless device and the server have agreed upon a shared symmetric key. Both parties would like to use this key to resume the session in the future without having to go through the expensive asymmetric authentication process all over again.

A widely used example of such a feature is the TLS 1.3 session resumption. The TLS version 1.3 offers improved privacy opposed to previous versions of TLS. This is accomplished using two features. First, the resumption ticket is sent from the server to the client in an encrypted form via the already established channel. This way an attacker cannot directly link the current session to the resumption handshake in the future. Second, the ticket age which would be transmitted in plain during the resumption handshake is obfuscated.

However, the data transmitted later on to the server also contains a static ticket identifier. In a wireless scenario, where a wireless device cannot necessarily address a specific server/station (e.g., via a domain name), it might be easy for a malicious attacker to probe the wireless device for a ticket and therefore track it. Note, that TLS suggests that tickets are only used once, but it is the task of the server to check for multiple use and a malicious server would not do that. Finally, due to the volatile nature of wireless connections, a single use of a ticket might unnecessarily increase the need for asymmetric authentication as a fallback mechanism due to network interruptions etc.

Accordingly, the session resumption identifier needs to be sent in a randomized way so that a server can still recover the data indicating the session resumption identifier. This problem may be overcome by the wireless device generating a salt and sending salted hashes of the resumption identifier as well as the salt to the server. This way, an attacker cannot correlate different answers of the wireless device to one another as being from the same wireless device. The server then may then use the salt to hash every resumption identifier that it stores in its database of resumption identifiers.

Then the server may then compare the received hashed resumption identifier from a wireless device to the hashes of the resumption identifiers in its database to determine if there was a previous session with the wireless device and which session key to use to resume the communication session. One problem with this approach is that the complete database of resumption identifiers has to hashed and searched until a match is found.

This approach would impose a massive computational overhead on the server side for finding the corresponding resumption identifier. To remedy this challenge, the server may maintain the salt. For example, the server periodically updates the salt according to a policy where the salt value increases. This may include incrementing the salt every N transactions or once a specified period of time has elapsed. This salt is then used to hash all of the resumption identifiers that the server has in its database. Then when the server receives a hashed resumption identifier from a wireless device, it only takes a database look up to find (or as the case may be not find) the corresponding resumption identifier. This database lookup is much faster than the database search described above. During the resumption process, the server shares the salt with the wireless device.

When the server selects the salt, a malicious server may send the same salt over and over again to the wireless device. This may lead to the wireless device being traceable, because the wireless devices response would always be the same as the same salt is used for each response. In addition, a protection mechanism is deployed to prevent the server from misusing its capability to choose the salt which could again hamper the wireless device's privacy.

FIG. 1 illustrates a flow diagram for the resumption of a secure communication session between a wireless device and a server. The resumption method 100 begins at 105, and the wireless device sends a message requesting the establishment of a secure communication session for communication with the server, and the wireless device sends a device nonce to the server 110. In this message the wireless device indicates whether it wants to resume a previous session and whether it wants to update the symmetric key.

The server receives the request from the wireless device and determines if the wireless device has requested the resumption of a previous session 115. If the wireless device requested a resumption, the server replies with a server identifier, a server nonce, and a salt S 120. If no resumption is requested, the server would simply build up an ephemeral Diffie-Hellman based secure communication channel and continue with asymmetric mutual authentication with the wireless device 155 to establish a secure communication session. In this case, the server would not send its server identifier in the clear using plaintext.

Once the wireless device receives the server identifier, server nonce, and salt, the wireless device checks if it has a shared key K for communication with the server based upon the server identifier 125. If not, it performs asymmetric mutual authentication with the wireless device 155.

If the wireless device has a shared key K for communication with the server, the wireless device checks whether the salt S provided by the server meets the requirements described below with respect to a salt threshold value T stored together with K 130. If not, it performs asymmetric mutual authentication with the wireless device 155.

If the received salt S meets the specified requirements, the wireless device calculates a salted identifier of the key K, for instance by calculating a hash H(S, K) 135.

The wireless device may establish a new session key based on the server nonce, the wireless device nonce, the salt S, and the key K 140, when the wireless device requests a new session key. This may be done by using a key derivation function KDF(K, S|device_nonce|server_nonce), where the key derivation function may be any type of key derivation function that is agreed upon between the wireless device and the server.

The wireless device replies with the salted identifier and the wireless device nonce 145, and the wireless device may use the new session key (if requested) or the existing session key to start the encrypted session.

The server receives the salted identifier and the wireless device nonce and looks up the salted identifier in its database 150. If the salted identifier is found, the server may also calculate the new session key if a new session key was requested by the wireless device or use the previously established key and participate in the encrypted session. The resumption method then ends at 160.

If the wireless device requested an update of the symmetric key, both the wireless device and the server update their stored key values K.

The wireless device needs to pursue a policy to prevent probing by a malicious attacker. In particular, the wireless device needs to take measures to prevent inappropriate replays of the value S. Thus, after a salted identifier has been sent, the wireless device needs to perform a check on the salt S received from the server. Three different approaches for checking, by the wireless device, the validity of a salt value received from the server using a salt threshold value T will now be described. The value of T may be established during the first session establishment, when the device and the server agree on a key K. At this time the server also sends its current value of S. S may be an integer that is incremented periodically (e.g., every 5 minutes or every 100 transactions) by the server. At that point the server also updates its database of salted hashes. The device sets its value T to the received value S.

In the first approach, the wireless device determines if $S \geq T$. If so, update T as follows: $T=S+1$. If S is not greater than or equal to T, then the check of the salt S fails, and as described above, the wireless device performs asymmetric mutual authentication with the wireless device. This approach allows for a single use of a given salt value, and hence prevents an attacker from using a replay of a prior server response, because as the salt threshold and salt changes, a replay of the prior server response would be rejected.

The second approach introduces a counter (Counter) and a counter threshold (Counter_Threshold). The counter counts how many times the current salt value has been used. The counter threshold places a limit on the number of times a salt value may be used. The second approach may be described using the following pseudocode:

```
if S ≥ T AND if Counter < Counter_Threshold then
    Counter++
    if S > T then
        T := S
        Counter := 0
    endif
    if Counter == Counter_Threshold then
        T++
        Counter := 0
    endif
else
    perform asymmetric mutual authentication
endif
```

As illustrated in the pseudocode, the wireless device determines if S≥T and if Counter<Counter_Threshold. If so, the counter is incremented by 1. Further, if S>T, then T is updated to the value of S, and the Counter is reset to zero. Also, if Counter equals Counter_Threshold, then T is incremented by one (or another agreed value) and the value of Counter is set to 0. As in the first approach, if S is not greater than or equal to T, then the check of the salt S fails, and as described above, the wireless device performs asymmetric mutual authentication with the wireless device. This approach allows for multiple uses of a given salt value up to a predetermined number of times specified by Counter_Threshold. Hence if an attacker replays a prior server response to track the wireless device, it may only do so a limited number of times. Once the attacker probes the wireless device, and the wireless device reaches the Counter_Threshold, the salt will be changed and replays of the prior server response are rejected, and hence the attacker loses track of the wireless device.

The third approach introduces a time threshold (Time_Threshold). Time_Threshold provides a time limit for when the salt is valid. This means that the wireless device and the server can keep track of absolute or elapsed time which is then compared to the time threshold to verify that the current salt is valid. The third approach may be described using the following pseudocode:

```
if S ≥ T then
    if S > T then
        T := S
        Current_time := 0
    endif
    if Current_time ≥ Time_threshold then
        // no need to update values, as they will be updated during the
            following
        // authentication
        perform asymmetric mutual authentication
    endif
else
    perform asymmetric mutual authentication
endif
```

As illustrated in the pseudocode, the wireless device determines if S≥T. If so, the wireless device determines if S>T, and if so, then T is updated to the value of S and Current_Time is set to 0. If Current_Time is greater than or equal to the Time_Threshold, the wireless device performs asymmetric mutual authentication with the wireless device. As in the first approach, if S is not greater than or equal to T, then the check of the salt S fails, and as described above, the wireless device performs asymmetric mutual authentication with the wireless device. This approach allows for multiple uses of a given salt value during a specified time period based upon the Time_Threshold. Hence, if an attacker replays a prior server response to track the wireless device, it may only do so during a limited time frame. Once the attacker probes the wireless device and the time frame has expired, the salt will have changed, replays of the prior server response are rejected, and hence, the attacker loses track of the wireless device.

In another embodiment, when the salt is invalid, the wireless device could inform the server that the salt value is invalid, but provide a salt value of its own. Then the server would need to compute the salted hashes of existing session keys using the salt provided by the client and search through all these computed hashes based upon the salt provided by the wireless device to find a match. This step would be computationally intensive as discussed above, but would only occur if there was a connection problem or the device tries to connect more frequently than the server updates its database, and may require less computation than performing an asymmetric mutual authentication. For example, if the number of database entries is small updating the database entries may take less computation than performing the asymmetric mutual authentication. Accordingly, the server may determine the number of database entries and then based upon a threshold value, decide whether to update the database or perform the asymmetric mutual authentication.

In another embodiment, the wireless device nonce and the server device nonce which are exchanged in the session resumption method as described above are already the ephemeral Diffie-Hellman public keys. This way, if the wireless decides that it needs to fall back to the asymmetric authentication protocol, it may already reply in an encrypted manner by using Diffie-Hellman key exchange to derive a shared key.

The resumption method is described for use in in a wireless communication system with a wireless device and a server, but the resumption method disclosed herein is not limited to use with a wireless device. The resumption method may also be used in any other communication system where there a device needs to query a plurality of servers to resume a secure communications session when an attacker may have access to the communication channel and attempt to track the device.

Figure 2:
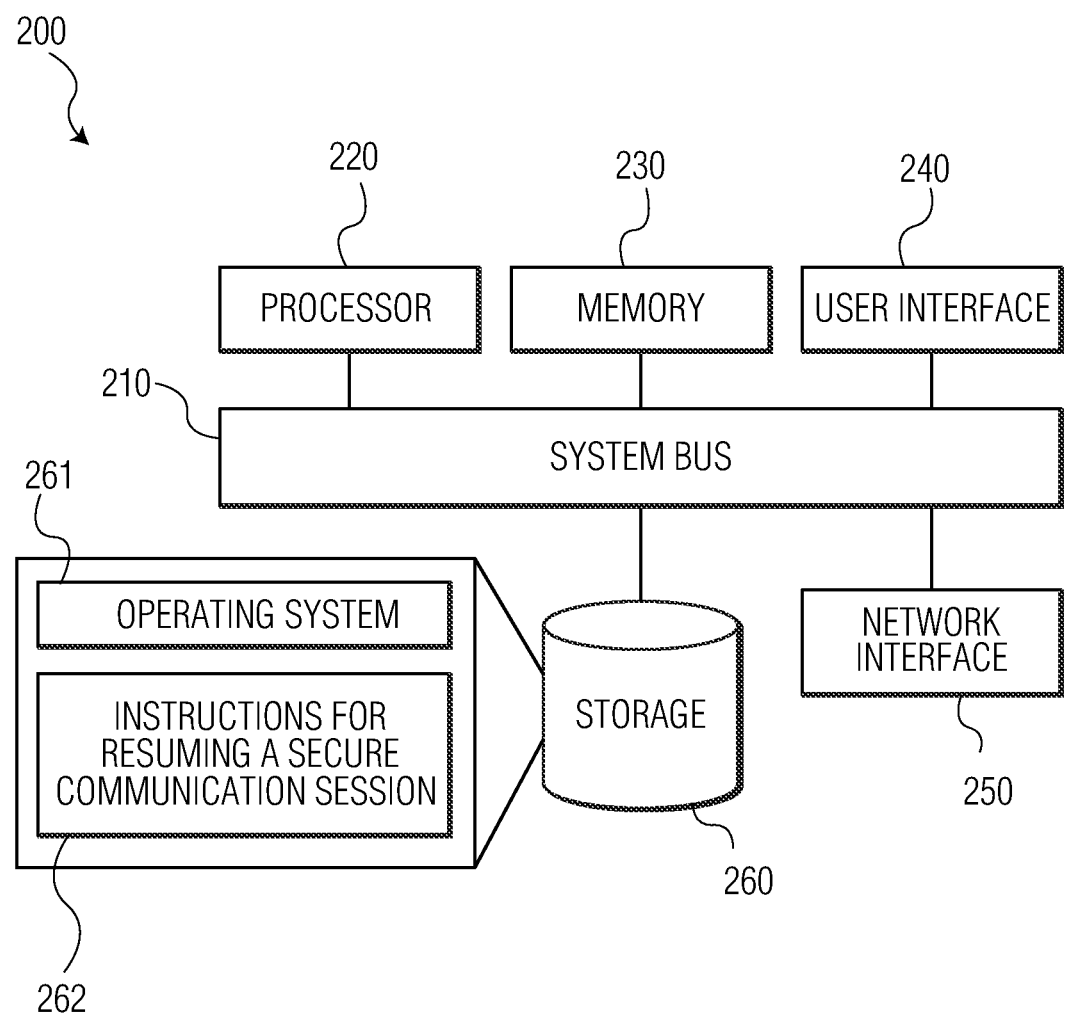
FIG. 2 illustrates an exemplary hardware diagram for implementing the resumption method on either the wireless device or server as described above.

FIG. 2 illustrates an exemplary hardware diagram 200 for implementing the resumption method on either the wireless device or server as described above. As illustrated, the device 200 includes a processor 220, memory 230, user interface 240, network interface 250, and storage 260 interconnected via one or more system buses 210. It will be understood that FIG. 2 constitutes, in some respects, an abstraction and that the actual organization of the components of the device 200 may be more complex than illustrated.

The processor 220 may be any hardware device capable of executing instructions stored in memory 230 or storage 260 or otherwise processing data. As such, the processor may include a microprocessor, microcontroller, graphics processing unit (GPU), field programmable gate array (FPGA), application-specific integrated circuit (ASIC), or other similar devices.

The memory 230 may include various memories such as, for example L1, L2, or L3 cache or system memory. As such, the memory 230 may include static random-access memory (SRAM), dynamic RAM (DRAM), flash memory, read only memory (ROM), or other similar memory devices.

The user interface 240 may include one or more devices for enabling communication with a user as needed. For example, the user interface 240 may include a display, a touch interface, a mouse, and/or a keyboard for receiving user commands. In some embodiments, the user interface 240 may include a command line interface or graphical user interface that may be presented to a remote terminal via the network interface 250.

The network interface 250 may include one or more devices for enabling communication with other hardware devices. For example, the network interface 250 may include a network interface card (NIC) configured to communicate according to the Ethernet protocol or other communications protocols, including wireless protocols. Additionally, the network interface 250 may implement a TCP/IP stack for communication according to the TCP/IP protocols. Various alternative or additional hardware or configurations for the network interface 250 will be apparent.

The storage 260 may include one or more machine-readable storage media such as read-only memory (ROM), random-access memory (RAM), magnetic disk storage media, optical storage media, flash-memory devices, or similar storage media. In various embodiments, the storage 260 may store instructions for execution by the processor 220 or data upon with the processor 220 may operate. For example, the storage 260 may store a base operating system 261 for controlling various basic operations of the hardware 200. The storage 262 may include instructions for implementing the resumption method described above.

It will be apparent that various information described as stored in the storage 260 may be additionally or alternatively stored in the memory 230. In this respect, the memory 230 may also be considered to constitute a "storage device" and the storage 260 may be considered a "memory." Various other arrangements will be apparent. Further, the memory 230 and storage 260 may both be considered to be "non-transitory machine-readable media." As used herein, the term "non-transitory" will be understood to exclude transitory signals but to include all forms of storage, including both volatile and non-volatile memories.

While the host device 200 is shown as including one of each described component, the various components may be duplicated in various embodiments. For example, the processor 220 may include multiple microprocessors that are configured to independently execute the methods described herein or are configured to perform steps or subroutines of the methods described herein such that the multiple processors cooperate to achieve the functionality described herein. Further, where the device 200 is implemented in a cloud computing system, the various hardware components may belong to separate physical systems. For example, the processor 220 may include a first processor in a first server and a second processor in a second server.

The resumption system and method described herein provides a technological solution to improving the privacy of a user of a device seeking to resume a secure communication session with a server, when an attacker has access to the communication channel. Such an attacker may attempt to replay messages from a server to a device in order to track the device based upon its replies to an apparently valid message. The resumption system and method described herein, uses a changing salt value and threshold value that helps to determine if a salt used by a server is valid. This changing salt value prevents an attacker from effectively using a replay attack to track the device and hence compromise the device's privacy.

Any combination of specific software running on a processor to implement the embodiments of the invention, constitute a specific dedicated machine.

As used herein, the term "non-transitory machine-readable storage medium" will be understood to exclude a transitory propagation signal but to include all forms of volatile and non-volatile memory.

It should be appreciated by those skilled in the art that any block diagrams herein represent conceptual views of illustrative circuitry embodying the principles of the invention.

Although the various exemplary embodiments have been described in detail with particular reference to certain exemplary aspects thereof, it should be understood that the invention is capable of other embodiments and its details are capable of modifications in various obvious respects. As is readily apparent to those skilled in the art, variations and modifications can be affected while remaining within the spirit and scope of the invention. Accordingly, the foregoing disclosure, description, and figures are for illustrative purposes only and do not in any way limit the invention, which is defined only by the claims.

What is claimed is:

1. A method for resuming, by a server, a secure communication session with a device, comprising:
storing salted identifiers in a server database, wherein each salted identifier stored within the server database is based upon shared keys and a salt;
receiving a message from the device requesting the resumption of a secure communication session;
sending to the device a server identifier, a server nonce, and the salt, and wherein the salt is a valid salt when the salt is greater than or equal to a salt threshold T, and in response to the sale being valid, the value of the salt threshold T is updated to an incremented value of the salt;
receiving a salted identifier from the device, wherein the salted identifier is based upon a shared key and the incremented value of the salt;
determining that the received salted identifier has a match in the server database; and
resuming the secure communication session with the device in response to determining that the received salted identifier has a match in the server database.

2. The method of claim 1, wherein the salt is updated based upon a policy where the salt increases.

3. The method of claim 1, wherein the salt is incremented every N transactions, where N is an integer greater than or equal to 1.

4. The method of claim 1, wherein the salt is incremented after a specified period of time has passed.

5. The method of claim 1, further comprising establishing a new session key.

6. The method of claim 1, wherein when the salt is not greater than or equal to the salt threshold T, an asymmetric mutual authentication between the server and device is performed.

7. A server configured to resume a secure communication session with a device, comprising:
a memory;
a processor coupled to the memory, wherein the processor is further configured to:
store salted identifiers in a server database, wherein each salted identifier stored within the server database is based upon shared keys and a salt;
receive a message from the device requesting the resumption of a secure communication session;
send to the device a server identifier, a server nonce, and the salt, wherein the salt is greater than or equal to a salt threshold T, and in response to the sale being valid, the salt threshold T is updated to an incremented value of the salt;
receive a salted identifier from the device, wherein the salted identifier is based upon a shared key and the incremented value of the salt;
determine that the received salted identifier has a match in the server database; and
resume the secure communication session with the device in response to the received salted identifier having a match in the server database.

8. The server of claim 7, wherein the salt is updated based upon a policy where the salt increases.

9. The server of claim 7, wherein the salt is incremented every N transactions, where N is an integer greater than or equal to 1.

10. The server of claim 7, wherein the salt is incremented after a specified period of time has passed.

11. The server of claim 7, wherein the processor is further configured to establish a new session key.

12. The server of claim 7, wherein when the salt is not greater than or equal to the salt threshold T, an asymmetric mutual authentication between the server and device is performed.

\* \* \* \* \*